United States Patent
Partch (12)

(10) Patent No.: US 7,628,438 B2
(45) Date of Patent: Dec. 8, 2009

(54) REAR SEAT CUSHION UNDERSIDE STORAGE FLAP

(75) Inventor: Tom Partch, Trenton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/585,020

(22) Filed: Oct. 23, 2006

(65) Prior Publication Data

US 2008/0093874 A1    Apr. 24, 2008

(51) Int. Cl.
*B60R 7/04*    (2006.01)

(52) U.S. Cl. .............. 296/24.46; 296/37.16; 296/65.05; 297/188.01

(58) Field of Classification Search .............. 296/24.46, 296/37.15, 37.16, 65.05; 297/188.01, 188.04, 297/188.08, 188.09, 188.1
See application file for complete search history.

(56) References Cited

U.S. PATENT DOCUMENTS

| | | | |
|---|---|---|---|
| 1,179,445 A | 4/1916 | Manning | |
| 2,369,552 A | 2/1945 | Ferran | |
| 2,531,096 A | 11/1950 | Alters | |
| 3,132,781 A | 5/1964 | Poczatek | |
| 4,273,376 A | 6/1981 | Duguet et al. | |
| 5,716,091 A | 2/1998 | Wieczorek | |
| 6,102,463 A * | 8/2000 | Swanson et al. | 296/37.15 |
| 6,161,896 A * | 12/2000 | Johnson et al. | 297/188.1 |
| 6,260,903 B1 * | 7/2001 | von der Heyde | 296/24.46 |
| 6,276,582 B1 | 8/2001 | Alexander | |
| 6,290,277 B1 | 9/2001 | Spykerman et al. | |
| 6,390,547 B1 | 5/2002 | Spykerman | |
| 6,695,378 B2 | 2/2004 | Hanagan | |
| 6,698,829 B1 * | 3/2004 | Freijy et al. | 297/188.09 |
| 6,837,531 B2 * | 1/2005 | Mack et al. | 296/65.09 |
| 6,874,667 B2 | 4/2005 | Dykstra et al. | |
| 6,981,730 B2 * | 1/2006 | Bixby | 296/37.15 |
| 2002/0005649 A1 * | 1/2002 | Hofmann et al. | 296/37.15 |
| 2006/0170236 A1 * | 8/2006 | Porter et al. | 296/37.16 |

FOREIGN PATENT DOCUMENTS

| | | |
|---|---|---|
| DE | 4417869 | 11/1995 |
| FR | 2831501 | 5/2003 |
| JP | 2000025530 | 1/2000 |

* cited by examiner

*Primary Examiner*—Dennis H Pedder
(74) *Attorney, Agent, or Firm*—Gregory Brown; Price, Heneveld, Cooper, DeWitt & Litton, LLP (57) ABSTRACT

A storage area defined by a folded-forward rear seat cushion, an upright rear seatback, the floor tunnel, and an article retaining flap which is stowed when not in use. The storage flap may be folded away for storage under the rear seat cushion when not in use.

19 Claims, 7 Drawing Sheets

REAR SEAT CUSHION UNDERSIDE STORAGE FLAP

TECHNICAL FIELD

The present invention relates generally to storage areas in motor vehicles. More specifically, the present invention relates to a storage area defined by a folded-forward rear seat cushion, an upright rear seatback, a floor tunnel, and an article retaining flap which is stowed when not in use.

BACKGROUND OF THE INVENTION

In the vehicle industry there is a desire to increase interior vehicle storage space, particularly within the vehicle cab. This increase in interior storage space is desired particularly when unused seats compromise space availability.

It is known in certain types of vehicles, particularly in trucks and sport utility vehicles, to provide a rear seat assembly in which the rear seat cushion may be rotated or flipped forward to allow the rear seat back to be folded forward, thus increasing the floor space of the vehicle for cargo.

Some owners of vehicles having rear seat cushions that can be folded forward have realized that when the rear seat cushion is folded forward to its vertical position and the rear seat back is left in its vertical position, an easy-to-access storage is formed between the vertical rear seat cushion, the vertical rear seat back and the tunnel. This space is cushioned on three sides and is large enough for carrying groceries, a brief case, a laptop computer or the like.

The difficulty with utilizing this space is that the closed door adjacent the space acts as the fourth wall which works well as a wall when the door is closed, but which is removed when the door is opened. Accordingly, there is no retention for items against the rear side door. Without this fourth wall, the groceries and other cargo may tumble out on opening of the door.

Accordingly, as in so many areas of vehicle technology, there is room in the art of vehicle foldable seat design for improving on the usefulness of the storage space provided when the rear seat cushion and the rear seat back are in their vertical positions.

SUMMARY OF THE INVENTION

The present invention provides a fourth wall to the three-walled storage space made available by the vertical rear seat cushion, the vehicle tunnel, and the vertical rear seat back. The fourth wall is preferably in the form of an article retaining flap which may be folded away for storage when not in use. The article retaining flap may be rigid, semi-rigid or flexible.

The flap may be stored in the door or in the rear seat back, but is preferably stored on the underside of the rear seat cushion in a defined space. If formed from a flexible material, the flap may be attached to a roller for storage in the defined space. If formed from a rigid or semi-rigid material, the flap may be stored without folding in the defined space. The flap may also be used to hold maps and other papers. If the flap is formed from a rigid or semi-rigid material, a flexible cargo net may also be attached to the outer side of the flap to hold various articles.

Other advantages and features of the invention will become apparent when viewed in light of the detailed description of the preferred embodiments when taken in conjunction with the attached drawings and the appended claims.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

In the following figures, the same reference numerals will be used to refer to the same components. In the following description, various operating parameters and components are described for one constructed embodiment. These specific parameters and components are included as examples and are not meant to be limiting.

Figure 1:
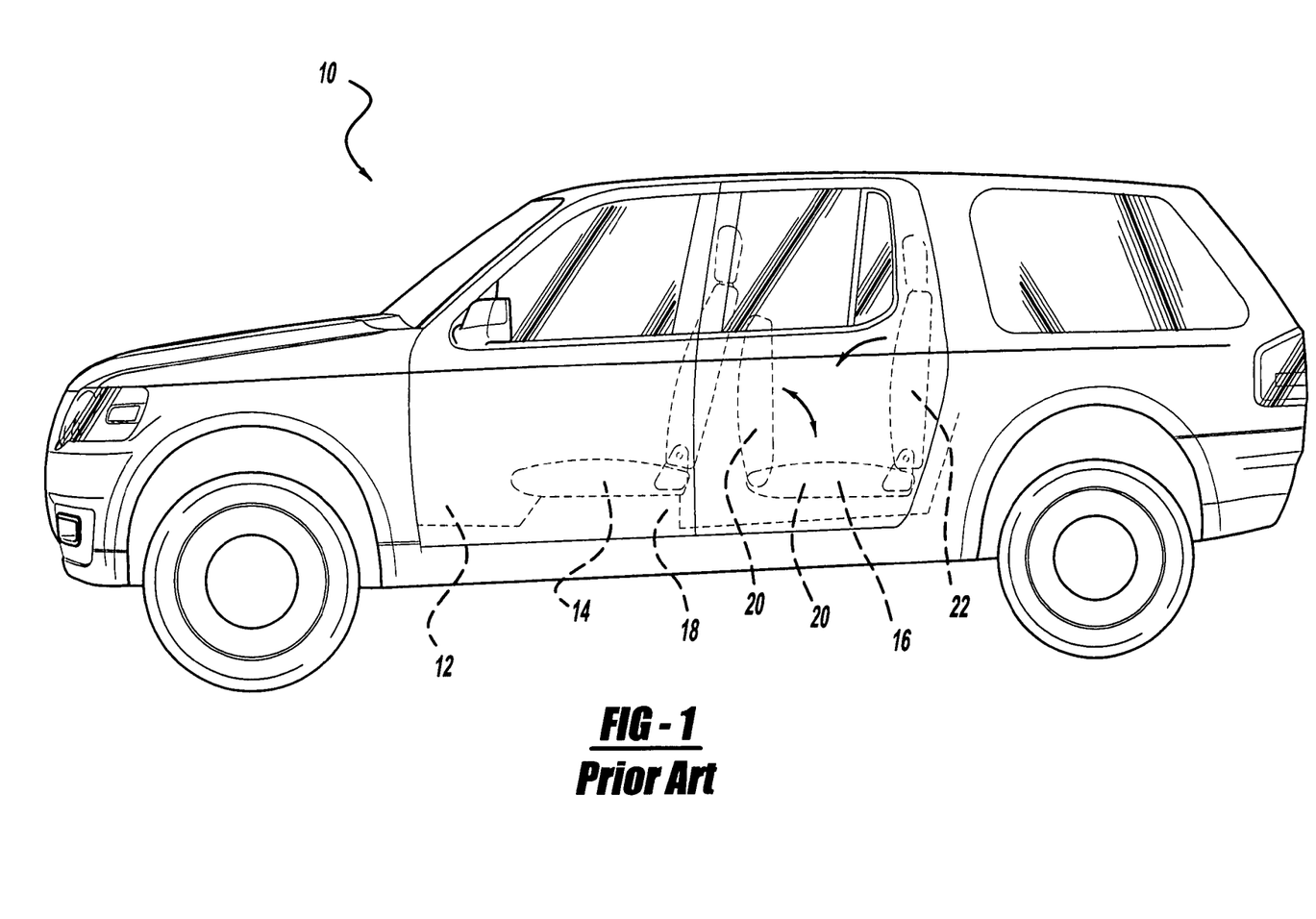
FIG. 1 shows a left side elevational view of a motor vehicle having a movable rear seat cushion and a stowable rear seat back according to the known art.

With reference to FIG. 1, a motor vehicle, generally illustrated as 10, includes a vehicle cabin 12. In the vehicle cabin is a front seat 14 and a rear seat 16. Both the front seat 14 and the rear seat 16 are mounted on a vehicle floor 18.

As is known in the art, the rear seat 16 includes a rear seat cushion 20 and a rear seatback 22. The rear seat cushion 20 is movable between a lowered position and a vertical upright position, both of which are illustrated In FIG. 1. When the rear seat cushion 20 is in its lowered position, the rear seat 16 may be used by a passenger for sitting. When the rear seat cushion 20 is in its upright position, the rear seatback 22 may be moved downward for disposition within the space formerly occupied by the rear seat cushion 20. With the rear seat cushion 20 in this lowered position (not illustrated), the vehicle 10 has more floor space for accommodating cargo as is known in the art.

Figure 2:
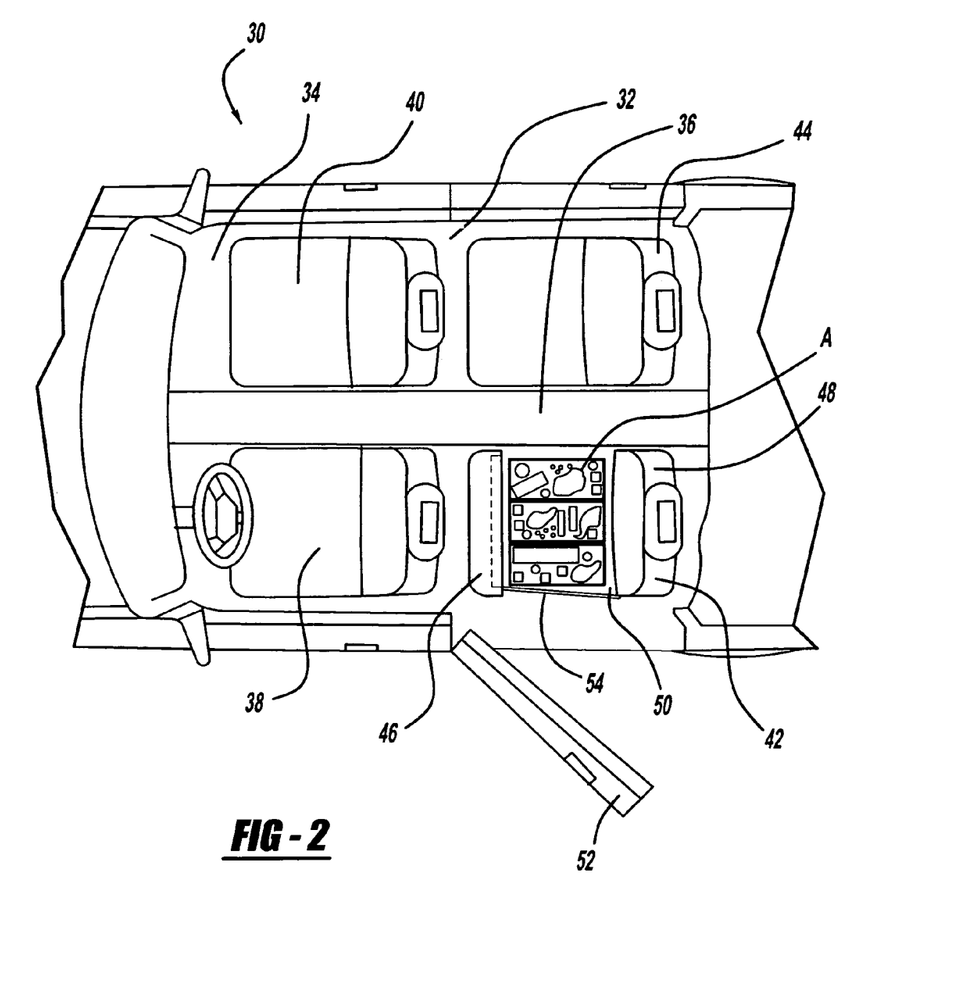
FIG. 2 is a top plan view of the storage space according to the present invention, illustrating the rear seat cushion and the rear seat back in their vertical positions and the article retaining flap in place between the rear seat cushion and the rear seat back to define a retaining wall.
Figure 3:
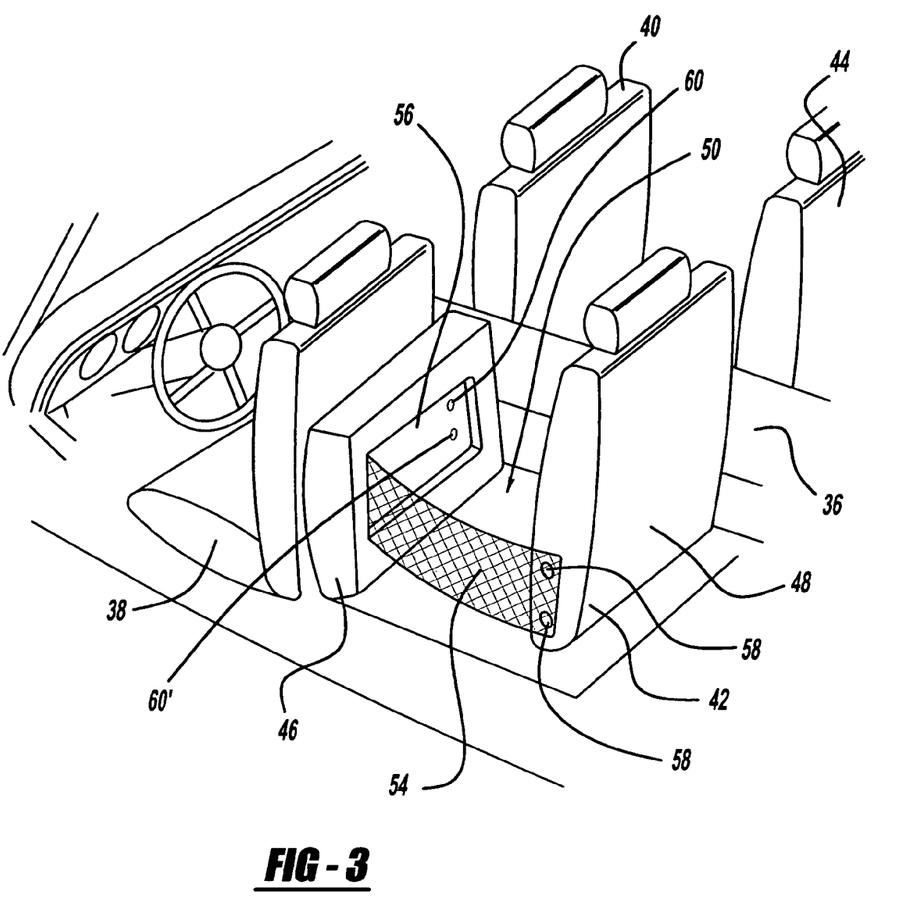
FIG. 3 is a perspective view of the view of FIG. 2 illustrating the storage flap in its operative position and showing the first preferred embodiment for storing the flap.
Figure 4:
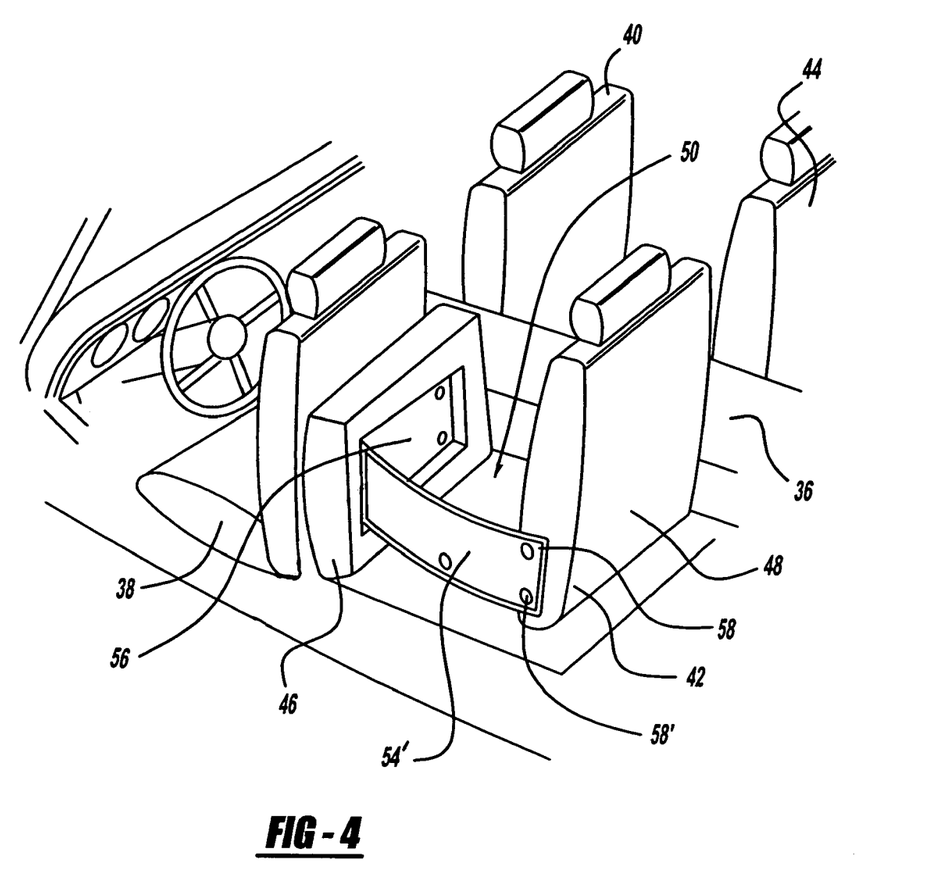
FIG. 4 is the same view as that shown in FIG. 3 but illustrating an alternate embodiment of the material used in construction of the storage flap in which a rigid or semi-rigid material is used.

Referring to FIGS. 2 through 4, the present invention is illustrated. In these figures a vehicle, generally illustrated as 30, includes an interior 32 having a vehicle floor 34. A tunnel 36 is formed on the vehicle floor 34. As is known, the tunnel 36 may be used for a drive shaft (not shown), in the case of a rear-wheel drive vehicle, or for an exhaust pipe (also not shown), in the case of a front-wheel drive vehicle.

The vehicle 30 includes a driver's seat 38, a front passenger seat 40, a left rear passenger seat 42, and a right rear passenger seat 44. The present invention relates to virtually any vehicle seat having a forward-folding seat cushion and thus, in FIGS. 2 through 4, relates to either the left rear passenger seat 42 or to the right rear passenger seat 44. In the instant case the left rear passenger seat 42 will be described, although the description herein could apply equally well to the right rear passenger seat 44.

With reference to the left rear passenger seat 42, the seat 42 includes a forward-folding seat cushion 46 and a rear seatback 48. In FIGS. 2 through 4 the seat cushion 46 is shown in its upright, vertical position. In this position, the rear seatback 48 could be folded forward into the space formerly occupied by the rear seatback 48. However, as illustrated, the seat cushion 46 has been folded forward into its upright vertical position thus defining a cargo space 50 between the tunnel 36, the vertically-positioned seat cushion 46, and the vertically-positioned rear seatback 48. The cargo space 50 provides a good area for storing a variety of articles, generally illustrated as "A," such as the illustrated bags of groceries.

It should be understood that while the tunnel 36 provides a wall for the cargo space 50, it may be that the vehicle 30 does not include a tunnel 36 or has a tunnel which is not tall enough to provide lateral support for the articles stored. In such a case the seat cushion of the adjacent seat 44 may act as a wall for the storage space 50. As a further alternative, and again in the event that there is no tunnel or little tunnel in the vehicle 30, other articles being stored in a storage space formed by a vertically-raised seat cushion of the adjacent seat 44 may also act as a wall for the storage space 50.

The vehicle 30 includes a left rear passenger door 52 which is illustrated in FIG. 2 in its opened position. To keep the articles "A" from falling to the ground when the door 52 is opened, an article retaining flap 54 is positioned between the seat cushion 46 and the rear seatback 48. It is to be understood that while the article retaining flap 54 is shown and described throughout this application as being connected to and thus suspended between the seat cushion 46 and the seatback 48, the flap 54 may be otherwise attached, such as between the driver's seat 38 at its forward end and an interior portion of the vehicle 30 at its rearward end (neither attachment point illustrated).

Referring to FIG. 3, the article retaining flap 54 of the present invention is more clearly illustrated. The article retaining flap 54 is shown suspended between the vertically-positioned seat cushion 46 and the vertically-positioned seatback 48. This is the position the retaining flap 54 would be in while used to hold articles.

When not in use, the article retaining flap 54 is most preferably stored in the seat cushion 46. According to the preferred embodiment of the present invention, the flap 54 may be stored in a flap storage area 56 formed in the back side of the seat cushion 46.

When in its un-stowed or extended position, the article retaining flap 54 is preferably attached to the seatback 48 by one or more fasteners 58, 58' such as ISOFIX® fasteners. However, any such fastener may be used provided that the selected fastener is able to be quickly and readily attached and released by the operator while providing adequate fastening strength so as to resist lateral motion of the articles "A" when the vehicle 30 makes hard turns. To use the flap 54, the operator attaches the fasteners 58, 58' to their respective bases in a known manner. When the article retaining flap 54 is not in use it may be readily stored in the flap storage area 56. When so stored, the fasteners 58, 58' may be attached to a fastener bases 60, 60' respectively.

The flap 54 illustrated in FIG. 3 is a net composed of a soft braided cord that is resilient and water-resistant. For example, the flap 54 may be formed from a polyethylene material. As an alternative to the net material used for the flap 54 in FIG. 3, the flap instead may be formed from a rigid material, such as a flat sheet of a polymerized material, or may be formed from a semi-rigid material. This alternate material is shown in FIG. 4 in which a flap 54' is illustrated in its extended position. Like the flap 54 of FIG. 3, the flap 54' is attached to the fasteners 58, 58'. The article retaining flap 54' is stored in the flap storage area 56 when not in use. As with the retaining flap 54 discussed above with respect to FIG. 3, when the retaining flap 54' is stored, the fasteners 58, 58' may be attached to a fastener bases 60, 60' respectively.

Figure 5:
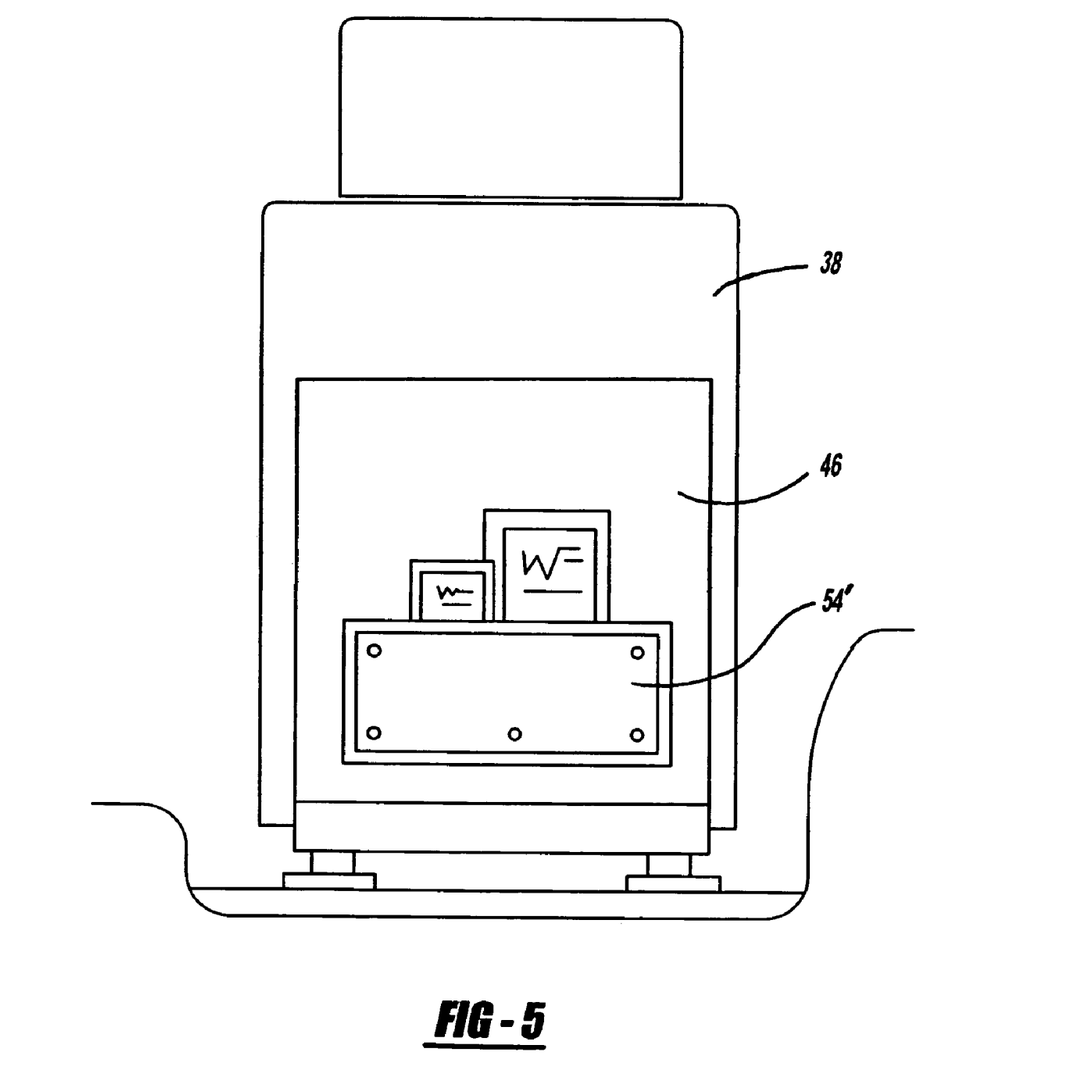
FIG. 5 is a view of flap of FIG. 4 in its stored position and serving an alternate function of holding papers.
Figure 6:
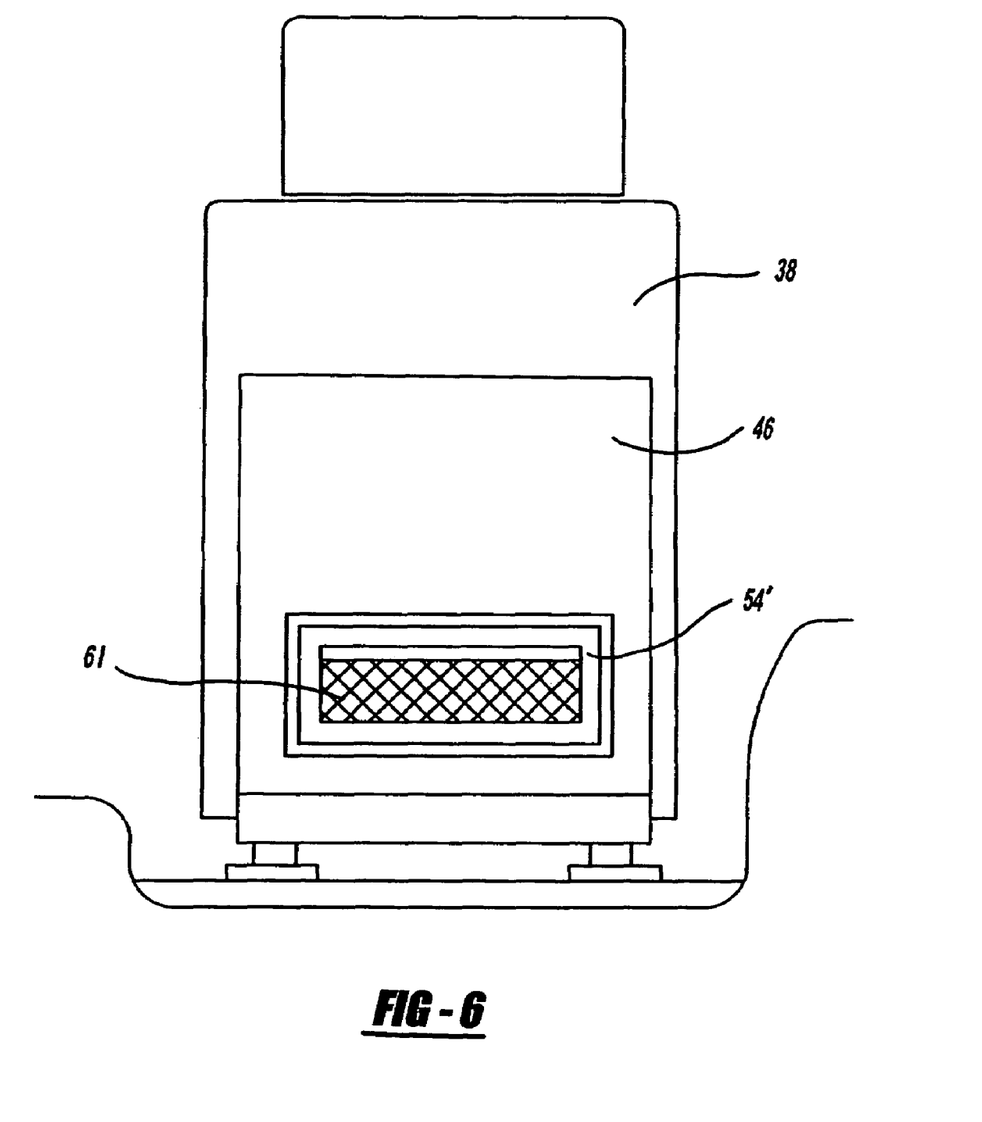
FIG. 6 is a view similar to that of FIG. 5 but showing a cargo net attached to the outer side of the flap.

The flap of the present invention may be used to hold items even when in its stowed position, thereby adding to its versatility. Examples of this use are shown in FIGS. 5 and 6. With respect first to FIG. 5, a variety of paper articles, generally illustrated as "P", are disposed between the upper end of the retaining flap 54' and the back side of the seat cushion 46. The paper articles P may be magazines, newspapers, maps and the like. As a variant of this storage arrangement, FIG. 6 illustrates a retaining flap cargo net 61 attached to the outer side of the retaining flap 54'. As with the retaining flap 54, the retaining flap cargo net 61 is composed of a soft braided cording and essentially defines an envelope. The retaining flap cargo net 61 can be used to hold a variety of small articles.

Figure 7:
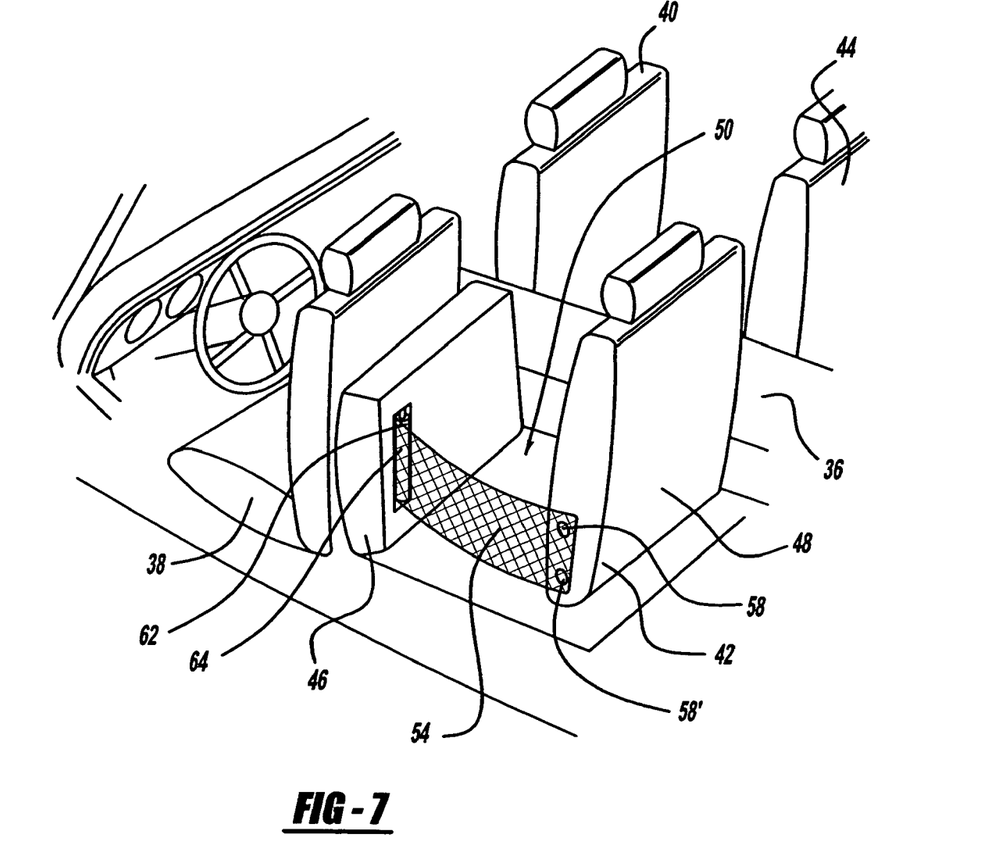
FIG. 7 is a view of the present invention similar to that of FIGS. 3 and 4 but showing an alternate arrangement for storing the flap.

An alternate embodiment for storing a flexible version of the article retaining flap 54 is shown in FIG. 7. With reference thereto, a roller assembly 62 is disposed within a roller housing 64 that is formed in the back side of the seat cushion 46. When use of the storage area 50 is desired, the operator extends the flap 54 from the roller housing 64 and attaches the fasteners 58, 58' to the fastener bases (not shown) fitted to the side of the seatback 48. When the fasteners 58, 58' are released from the fastener bases on the side of the seatback 48, the roller assembly 62 is allowed to take up the flap 54 for storage.

The foregoing discussion discloses and describes exemplary embodiments of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A storage area for a motor vehicle having a vehicle floor, the storage area having three walls and a base, said storage area comprising:
   a first substantially vertical wall defined by a cushion of a seat, said seat cushion being movable between a lowered position and an upright position, said seat cushion defining said first wall of the storage area when in said upright position;
   a second substantially vertical wall defined by a seatback, said seatback and said cushion forming a seat when said cushion is in its lowered position;
   a third substantially vertical wall defined by a flap, said flap being movable between a stowed position and an un-stowed position, said flap providing said third wall of the storage area when in said un-stowed position, wherein said flap is operatively associated with said seat cushion and the flap provides the third wall of the storage area extending between the seatback and the seat cushion when in the upright position; and
   a base, said base being defined by the vehicle floor.

2. The storage area for the motor vehicle of claim 1, further including a tunnel formed on the vehicle floor, said tunnel forming a fourth substantially vertical wall of the storage area.

3. The storage area for the motor vehicle of claim 1, wherein said flap is composed of a rigid material.

4. The storage area for the motor vehicle of claim 1, wherein said flap is composed of a flexible material.

5. The storage area for the motor vehicle of claim 4, wherein said flap includes a first end and a second end, said first end of said flap being attached to said seat cushion.

6. The storage area for the motor vehicle of claim 5 wherein said second end of said flap is releasably attachable to said seatback.

7. The storage area for the motor vehicle of claim 5 wherein said seat cushion includes a top side and a bottom side and wherein said first end of said flap is attached to said bottom side of said seat cushion.

8. The storage area of the motor vehicle of claim 7 wherein said bottom side of said seat cushion includes a flap storage area formed therein.

9. A storage area in a motor vehicle comprising:
 a seat cushion defining a first substantially vertical wall of the storage area, wherein said seat cushion is movable between a lowered, substantially horizontal position and an upright, substantially vertical position, said seat cushion providing said first wall of said storage area when in said vertical position;
 a seatback defining the second substantially vertical wall of the storage area;
 a flap defining a third substantially vertical wall of the storage area, wherein said flap is operatively associated with said seat cushion so that the flap defines the third wall of the storage area when the seat cushion is in the upright, substantially vertical position; and
 a base.

10. The flap of claim 9 wherein the storage area includes a tunnel, said tunnel forming a fourth substantially vertical wall of the storage area.

11. The flap of claim 9, wherein said flap is operatively associated with said seatback.

12. The flap of claim 9, wherein said flap is composed of a rigid material.

13. The flap of claim 9, wherein said flap is composed of a flexible material.

14. The flap of claim 9, wherein said flap includes a first end and a second end, said first end of said flap being attached to said seat cushion.

15. The flap of claim 9, wherein said seat cushion includes a top side and a bottom side and wherein said first end of said flap is attached to said bottom side of said seat cushion.

16. The storage area of the motor vehicle of claim 15 wherein said bottom side of said seat cushion includes a flap storage area formed therein.

17. A storage area for a motor vehicle having a vehicle floor, the vehicle floor forming the base for the storage area, the storage area comprising:
 a seat attached to the vehicle floor, said seat having a seat cushion and a seatback, said seat cushion being movable between a lowered, substantially horizontal position and an upright, substantially vertical position, said seat cushion providing a first substantially vertical wall of the storage area when in said vertical position and said seatback providing a second substantially vertical wall of the storage area; and
 a flap movable between a stowed position and an un-stowed position, said flap providing a third substantially vertical wall of the storage area when in said un-stowed position, said flap being composed of a flexible material and including a first end and a second end, said first end of said flap being attached to said seat cushion, said second end of said flap being releasably attachable to said seatback.

18. The storage area of claim 9, wherein the flap includes a first end and a second end, said first end of said flap being attached to said seat cushion and the second end being attached to said seatback.

19. The storage area of claim 1, wherein the flap includes a first end and a second end, said first end of said flap being attached to said seat cushion and the second end being attached to said seatback.

* * * * *